(12) United States Patent
Aikawa

(10) Patent No.: US 6,409,371 B2
(45) Date of Patent: Jun. 25, 2002

(54) VEHICLE LAMP

(75) Inventor: Shinji Aikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/919,010

(22) Filed: Jul. 31, 2001

(30) Foreign Application Priority Data

Aug. 2, 2000 (JP) ........................................ 2000-233969

(51) Int. Cl.[7] ................................................ F21V 5/00
(52) U.S. Cl. ........................ 362/520; 362/61; 362/494; 362/231; 156/297
(58) Field of Search ................................ 362/539, 810, 362/293, 520, 509, 494, 231, 61; 359/891; 156/297, 303.1, 300

(56) References Cited

U.S. PATENT DOCUMENTS

| | | | | |
|---|---|---|---|---|
| 3,944,320 A | * | 3/1976 | McLintic | 350/1 |
| 4,107,366 A | * | 8/1978 | Rieser et al. | 428/215 |
| 4,855,877 A | | 8/1989 | Otaka | |
| 4,860,174 A | * | 8/1989 | Kato et al. | 362/61 |
| 4,868,725 A | * | 9/1989 | Sakagawa et al. | 362/231 |
| 4,872,745 A | * | 10/1989 | Fujisawa et al. | 350/357 |
| 4,965,950 A | | 10/1990 | Yamada | |
| 5,516,387 A | * | 5/1996 | Hoffman | 156/70 |
| 5,684,633 A | * | 11/1997 | Lutz et al. | 359/588 |
| 6,132,072 A | * | 10/2000 | Trunbull et al. | 362/494 |

* cited by examiner

Primary Examiner—Sandra O'Shea
Assistant Examiner—Jacob Y. Choi
(74) Attorney, Agent, or Firm—Fish & Richardson P.C.

(57) ABSTRACT

A vehicle lamp includes: a lamp chamber defined by a lamp body and a colorless transparent front lens; a light source disposed in the lamp chamber; and a printed sheet disposed inwardly of the front lens. The printed sheet includes a colorless transparent sheet main body of synthetic resin having a pattern consisting of a predetermined colored transparent layer printed on an internal surface of the front lens. The colored transparent layer and a convex three-dimensional colorless transparent layer are formed in a laminated fashion as a lower layer and an upper layer, respectively, on an external surface of the sheet main body. A plating-like printed layer and a light shielding layer are formed in a laminated fashion as a lower layer and an upper layer, respectively, on an internal surface of the sheet main body at a location matching the location of the convex three-dimensional colorless transparent layer.

10 Claims, 10 Drawing Sheets

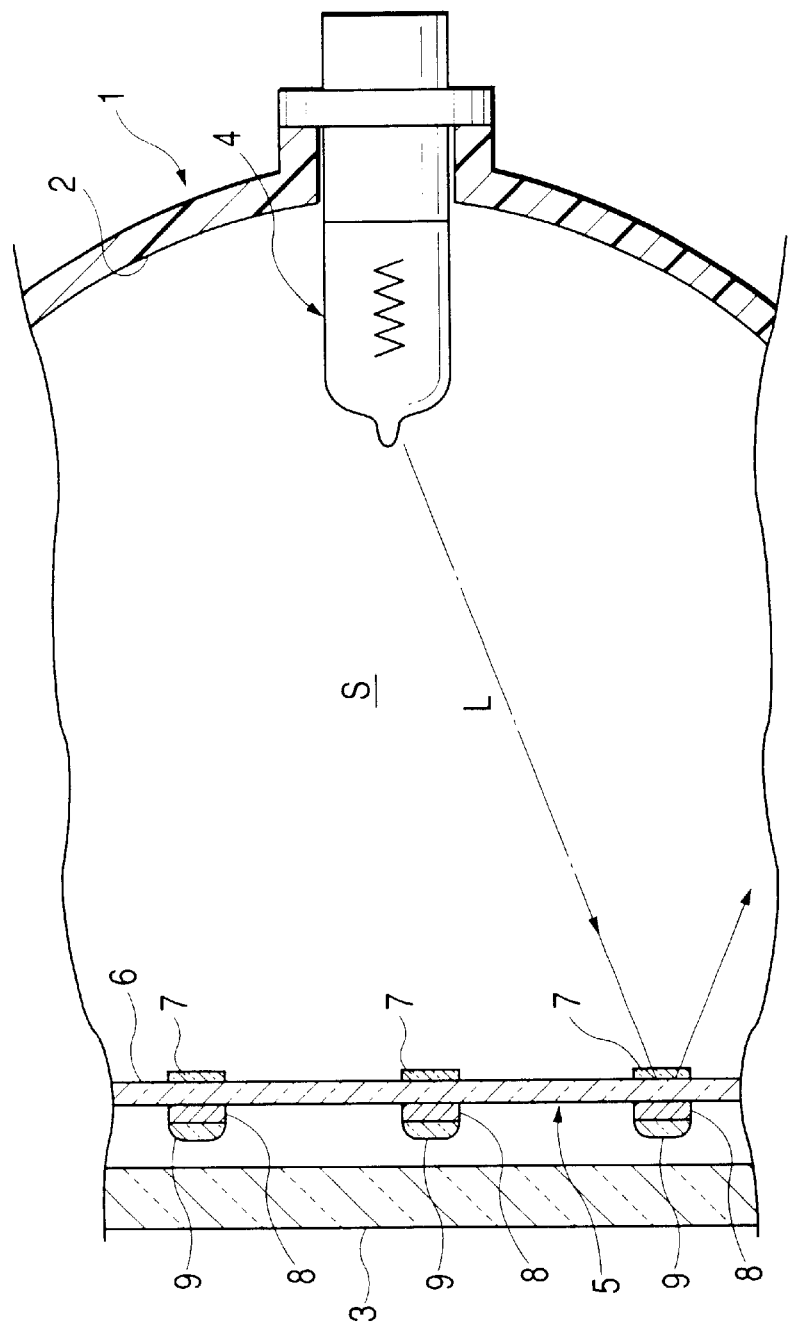

VEHICLE LAMP

BACKGROUND OF THE INVENTION

The present invention relates to a vehicle lamp in which a printed sheet having colored transparent films printed thereon in predetermined patterns is disposed inwardly of a front lens of the lamp so as to improve the external appearance thereof when not illuminated.

FIG. 10 shows a lamp according to the prior art. In this conventional lamp, a lamp chamber S is defined when a front lens 3 is installed in a front opening of a receptacle-like lamp body 1 in which a reflector 2 is formed integrally therewith, and a light source 4 is disposed in the lamp chamber S. In addition, a printed sheet 5 is disposed inwardly of the front lens 3 which printed sheet 5 has a colored transparent printed film formed thereon in a predetermined pattern.

This printed sheet 5 is constructed such that a colored transparent layer 7 is formed in a predetermined pattern in a laminated fashion on an internal surface of a colorless transparent sheet main body 6 made of synthetic resin, whereas a deposited film 8 and a convex transparent printed layer 9 are formed in a laminated fashion on an external surface of the sheet main body 6 at a location matching the location where the colored transparent layer 7 is formed. When the lamp is illuminated, light from the light source is colored by the colored transparent layer 7 by the time the light from the light source returns into the interior of the lamp chamber S after it has been reflected on the deposited layer 8 as indicated by an arrow L, and therefore, the colored light is reflected on the reflector 2 in a certain pattern, and when the line of sight is changed, the colored light in the pattern becomes visible or invisible depending on where the line of sight is located. In addition, when the lamp is not illuminated, external incident light on the convex transparent printed layer 9 is reflected on the deposited film 8 and then converges and refracts at the convex transparent printed layer 9, and therefore the colored pattern of the printed sheet is seen three dimensionally.

In the aforesaid conventional construction, however, since the light colored by the colored transparent layer 7 when the lamp is illuminated is reflected on the deposited film 8 and returns into the lamp chamber S, the front lens 3 emits light in a color which is a mixture of the colors of the light from the light source and the colored transparent layer 7. Thus, the conventional lamp so constructed has suffered from a problem that the application thereof is limited as the lamp cannot be applied to a lamp such as a backup lamp.

In addition, in the aforesaid conventional construction, the deposited film 8 is formed on the printed sheet 5, and since the formation of the deposited film 8 is expensive, the lamp is expensive to make.

SUMMARY OF THE INVENTION

The invention was made in view of the problems inherent in the prior art, and provides a vehicle lamp in which a predetermined colored pattern of a printed sheet is seen three-dimensionally through a front lens when not illuminated, while when illuminated the front lens emits predetermined functional colors which are free from being affected by the color of the colored pattern of the printed sheet.

According to a first aspect of the invention, there is provided a vehicle lamp in which lamp chambers are defined by a receptacle-like lamp body and a colorless transparent front lens mounted in an front opening of the lamp body. Light sources are disposed in the lamp chambers, and a printed sheet is disposed inwardly of the front lens, the printed sheet comprising a sheet main body of synthetic resin having colored transparent layers printed in predetermined patterns on a surface of the sheet main body. The colored transparent layers and a convex three-dimensional colorless transparent layer are formed in a laminated fashion as lower layers and an upper layer, respectively, on at least part of an external surface of the sheet main body of the printed sheet. A plating-like printed layer and a light shielding layer are formed in a laminated fashion as a lower layer and an upper layer, respectively, on an internal surface of the sheet main body at a location matching the location of the convex three-dimensional colorless transparent layer.

In a case where the colored transparent layers are formed on part of the external surface of the sheet main body, external light transmitted through the colored transparent layers is reflected on the plating-like printed layer, and the predetermined colored pattern (the colored transparent layers) on the printed sheet located inwardly of the lens is seen shining through the transparent front lens when the lamp is not illuminated. Moreover, the predetermined colored pattern (the pattern formed by the convex three-dimensional colorless transparent layer) is seen three-dimensionally, as the convex three-dimensional colorless transparent layer acts as a lens.

In contrast, when the lamp is illuminated, white light rays from the light chamber side to the printed sheet are partially shielded by the light shielding layer, the remaining portion of the light from the light source is allowed to be transmitted through areas where the light shielding layer is not formed, i.e., areas where the colored pattern of the printed sheet is not formed (areas where the colored transparent layers are not formed), and is emitted from the front lens for forward distribution, whereupon the front lens is illuminated in a functional color (for example, white).

In addition, since light directed from the lamp chamber side to the colored transparent layers is shielded by the light shielding layer and hence no such light reaches the colored transparent layers, there is no risk of the front lens being illuminated in the color of the colored transparent layers. Namely, there is caused no risk of light assuming the color of the colored transparent layers being emitted directly from the front lens, or a risk of light assuming the color of the colored transparent layers entering the lamp chamber to be emitted together with the light from the light source.

Additionally, in a case where the colored transparent layer is formed on the whole area on the external surface of the sheet main body, when the lamp is not turned on, the predetermined colored pattern (the colored transparent layer) on the printed sheet located inwardly of the lens is seen through the transparent front lens, whereby the whole front lens is seen as assuming the color of the colored transparent layer. Furthermore, since external light allowed to be transmitted through the colored transparent layer is reflected on the plating-like printed layer, the predetermined colored pattern (the pattern formed by the convex three-dimensional colorless transparent layer) is seen shining, and moreover, the predetermined colored pattern is seen three-dimensionally as the convex three-dimensional colorless transparent layer acts as a lens.

When the lamp is illuminated, light led from the lamp chamber side to the printed sheet is partially shielded by the light shielding layer, but the remaining portion of the light is allowed to be transmitted through areas where the light shielding layer is not formed or areas where the colored transparent layer is formed so as to be emitted from the front lens for forward distribution. Thus, when the light from the light source transmits through the areas where the light shielding layer is not formed in the area where the colored transparent layer is formed, the light is caused to assume the color of the colored transparent layer, whereby the front lens is illuminated in a functional color (the color of the colored transparent layer).

According to a second aspect of the invention, there is provided a vehicle lamp as set forth in the first aspect of the invention, wherein the convex three-dimensional colorless transparent layer is formed on part of a surface of a colored transparent layer formed on the whole area of the external surface of the sheet main body. A colored opaque layer is also formed so as to be interposed between the colored transparent layer and the convex colorless transparent layer, the colored opaque layer having a color different from that of the colored transparent layer.

In the second aspect, when the lamp is not illuminated, the colored opaque layer and the colored transparent layer both on the printed sheet located inwardly of the lens are seen through the transparent front lens, and the colored pattern assuming the colors of the colored opaque layer and the colored transparent layer are seen three-dimensionally as the convex three-dimensional colorless transparent layer acts as a lens.

According to a third aspect of the invention, there is provided a vehicle lamp as set forth in the first or second aspect of the invention, wherein a colored opaque layer is formed so as to be interposed between the colored transparent layer and the convex colorless transparent layer. The colored opaque layer has a color different from that of the colored transparent layer and is provided with a gradation function in which the density of the color of the colored opaque layer changes gradually.

When the lamp is not illuminated, the colored opaque layer and the colored transparent layer both on the printed sheet located inwardly of the lens are seen shining through the transparent front lens, and the gradation colored pattern is seen three-dimensionally, in which the colors of the colored opaque layer and the colored transparent layer change gradually as the convex three-dimensional colorless transparent layer acts as a lens.

According to a fourth aspect of the invention, there is provided a vehicle lamp as set forth in the first aspect of the invention, wherein the colored transparent layer is provided with a horizontal stripe-like patterned portion in which a plurality of horizontally extending string-like portions are arranged sequentially in a vertical direction in substantially parallel with one another, and wherein the light sources are constituted by incandescent bulbs which emit while light.

When the lamp is not illuminated, the horizontal stripe-like colored pattern on the printed sheet located inwardly of the lens is seen shining three-dimensionally through the transparent front lens. When the lamp is illuminated, the light from the light source is allowed to be transmitted through area where the light shielding layer is not formed, or areas where the colored pattern is not formed on the printed sheet (areas where the colored transparent layer is not formed), so as to be emitted from the front lens for forward distribution, whereupon the front lens is illuminated while.

BRIEF DESCRIPTION OF THE DRAWINGS

FIG. 10 is a vertical cross-sectional view showing a main portion of a conventional lamp.

DETAILED DESCRIPTION

Embodiments of the invention will be described with reference to the appended drawings.

Figure 1:
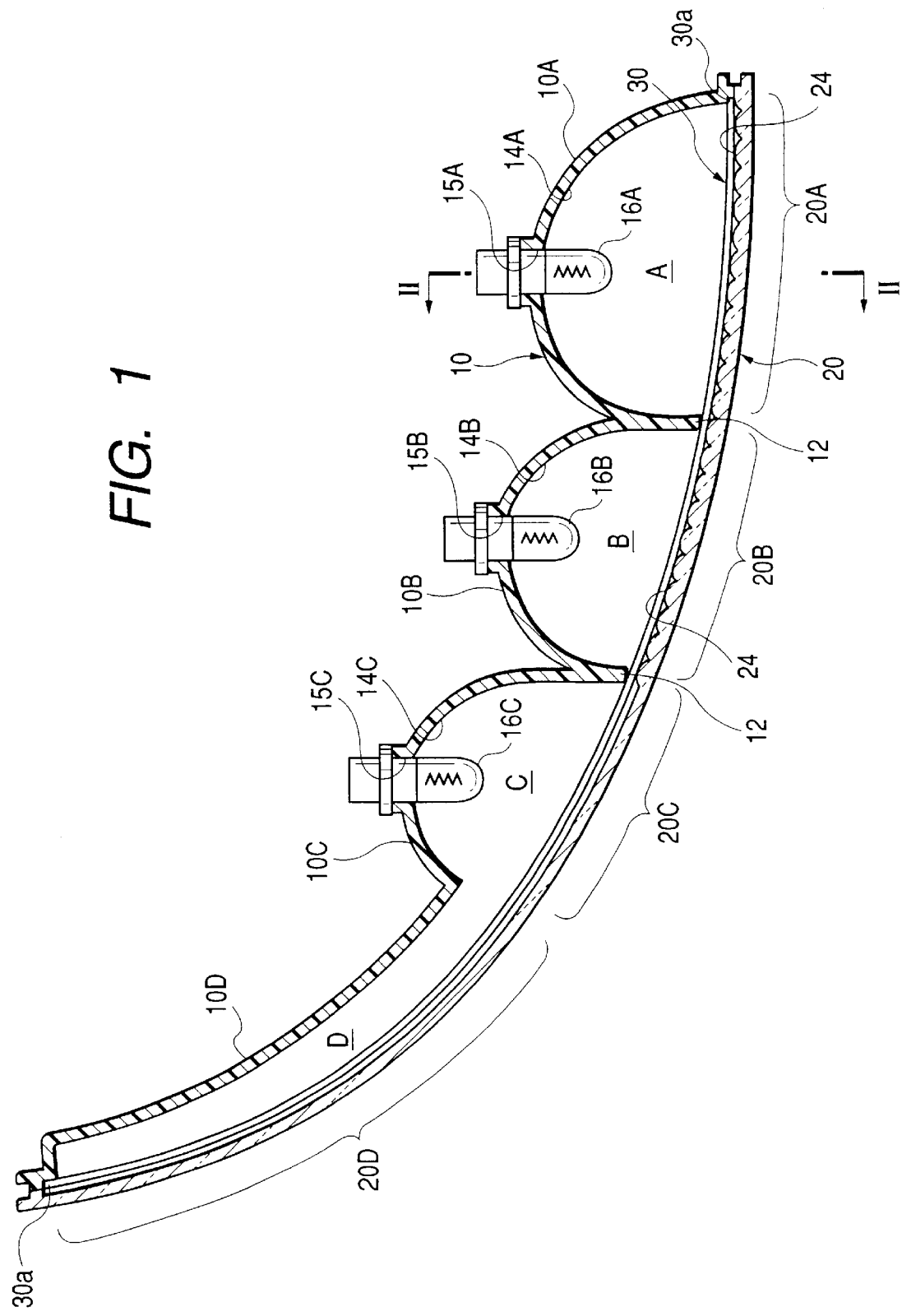
FIG. 1 is a horizontal cross-sectional view of an automotive rear combination lamp according an embodiment of the invention.
Figure 2:
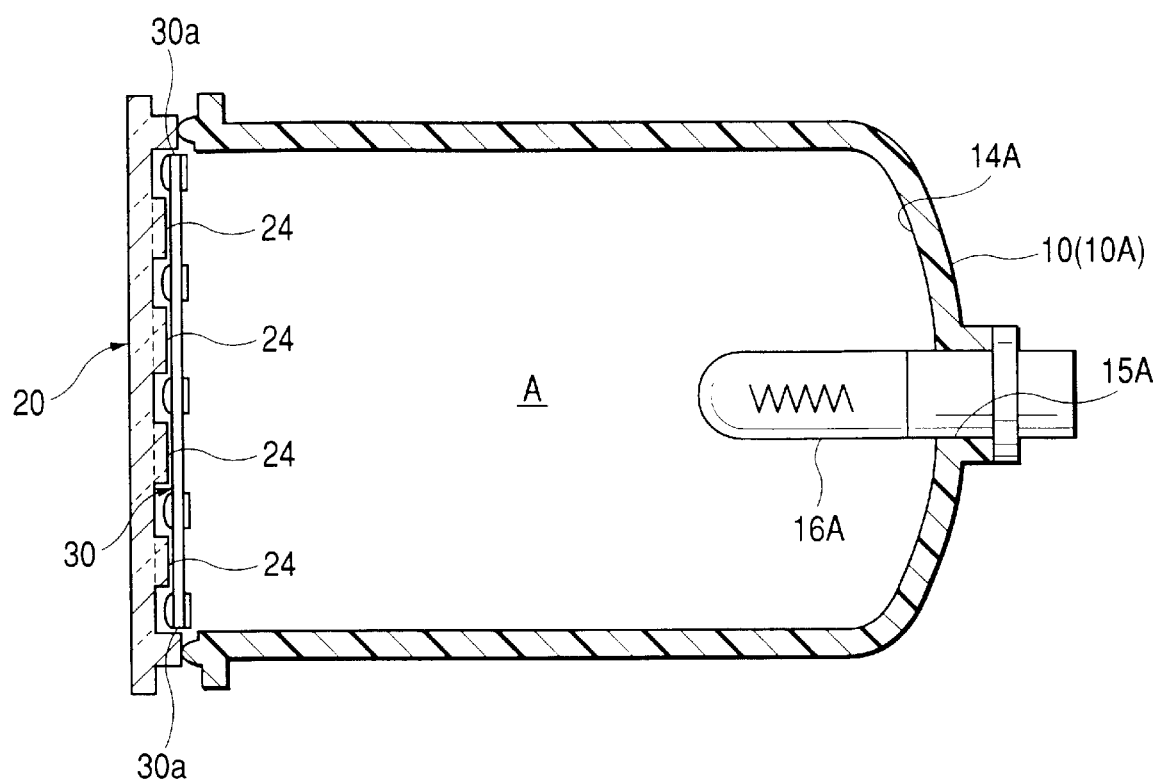
FIG. 2 is a vertical cross-sectional view of a portion of the rear combination lamp of FIG. 1 at a position where a-backup lamp is disposed, taken along the line II—II of FIG. 1.
Figure 3:
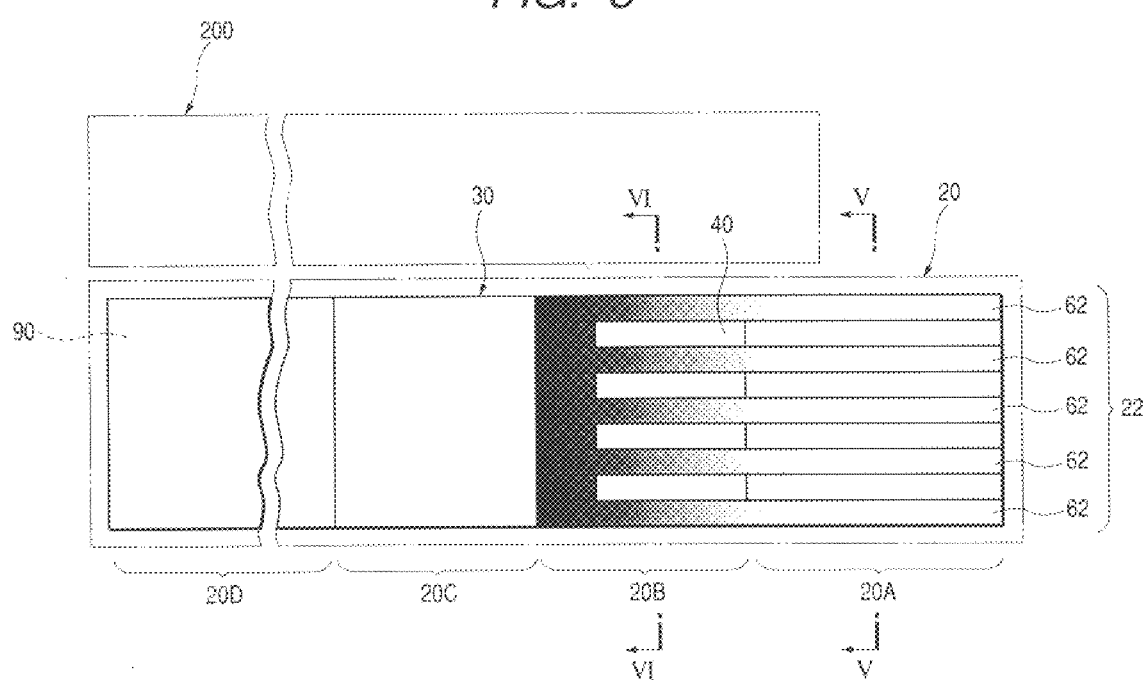
FIG. 3 is a front view of a printed sheet according to an implementation of the invention disposed inwardly of a front lens.
Figure 4:
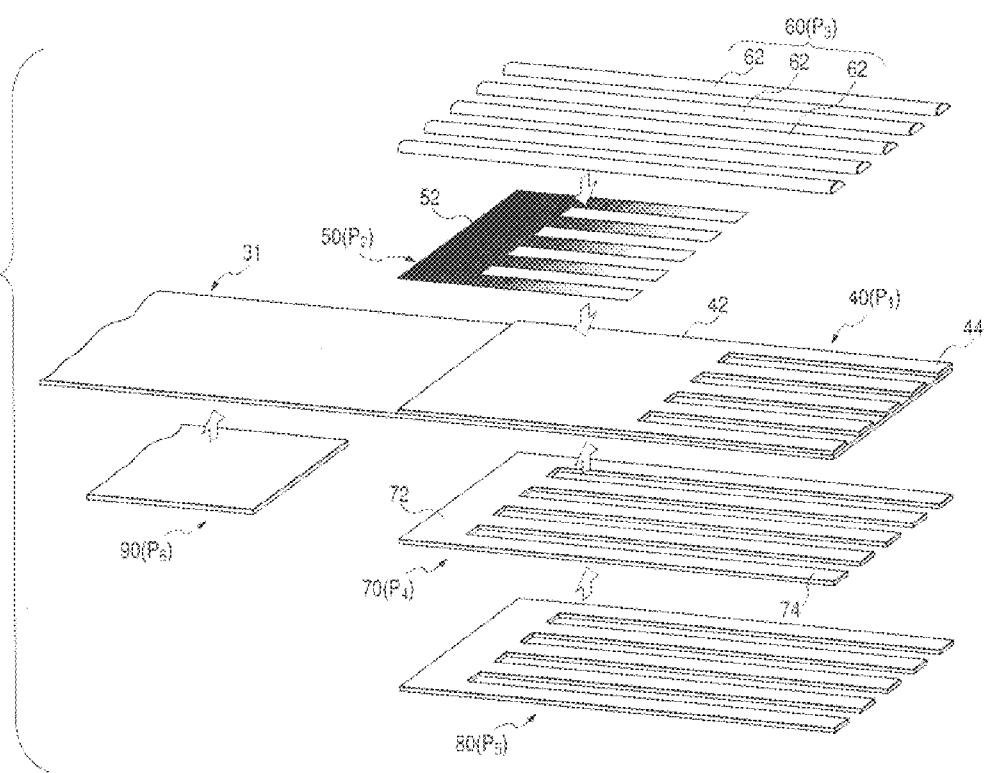
FIG. 4 is an enlarged, exploded perspective view of the printed sheet of FIG. 3.
Figure 5:
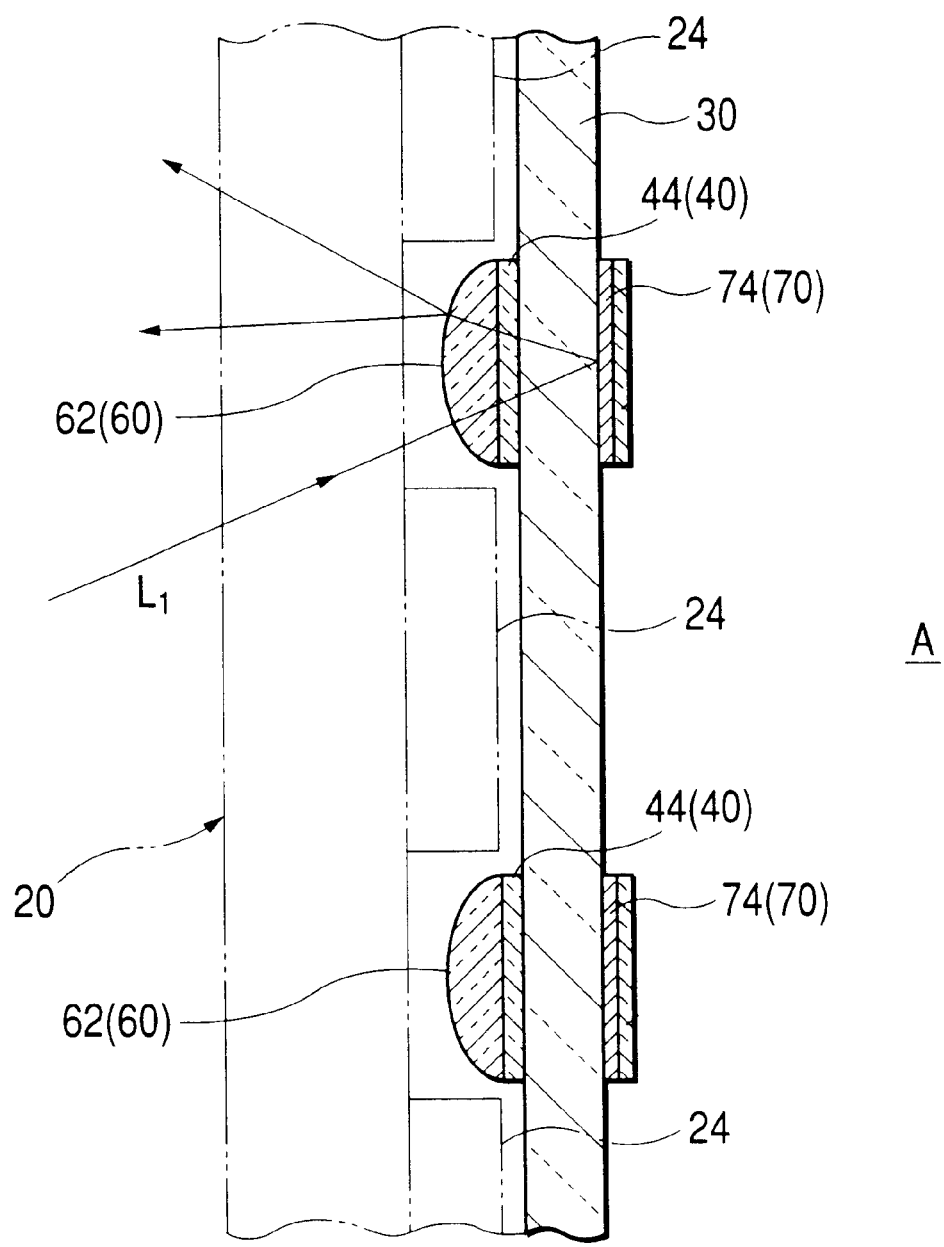
FIG. 5 is an enlarged vertical cross-sectional view of the printed sheet, taken along the line V—V shown in FIG. 3.
Figure 6:
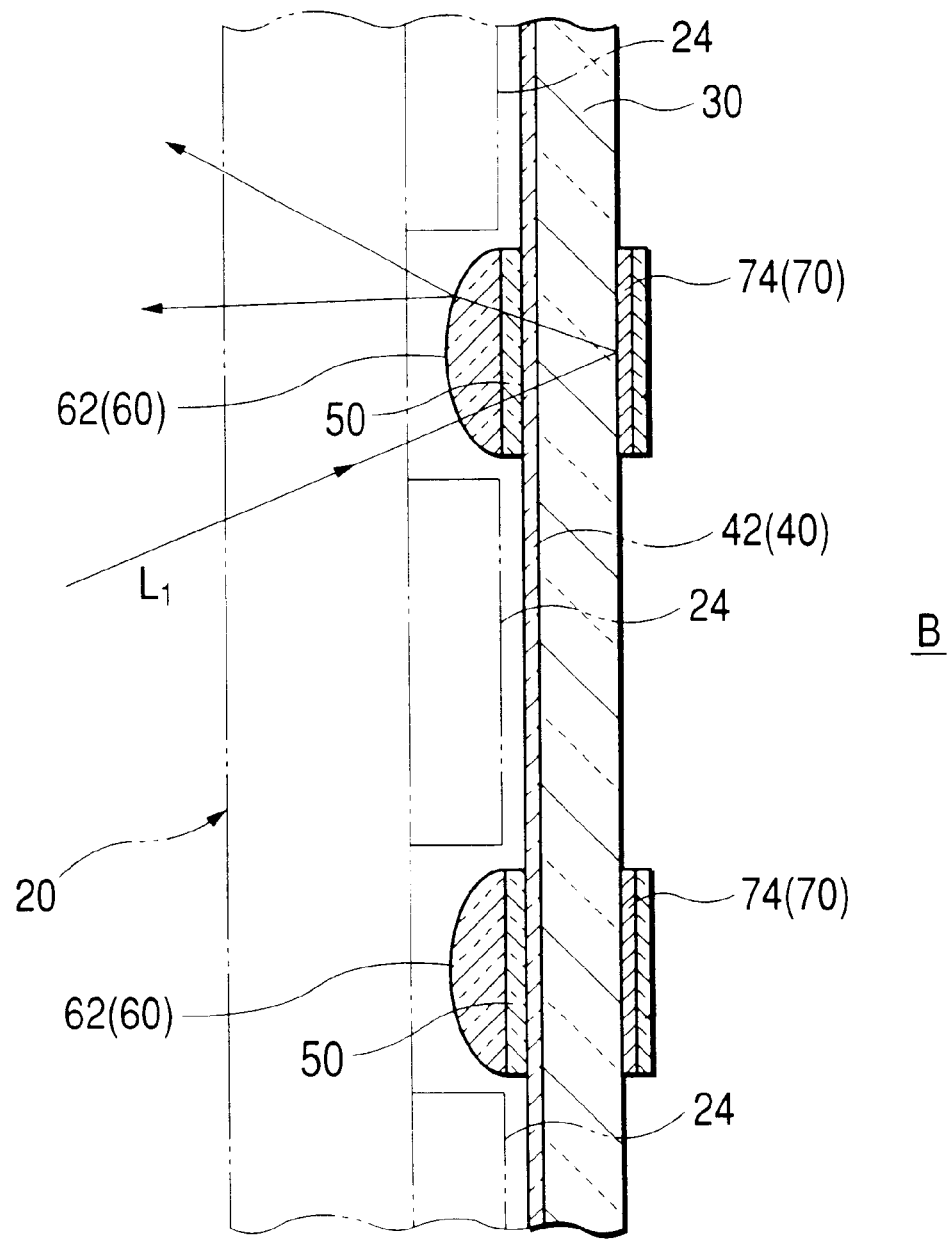
FIG. 6 is an enlarged vertical cross-sectional view of the lamp of FIG. 3, taken along the line VI—VI shown in FIG. 3.
Figure 7:
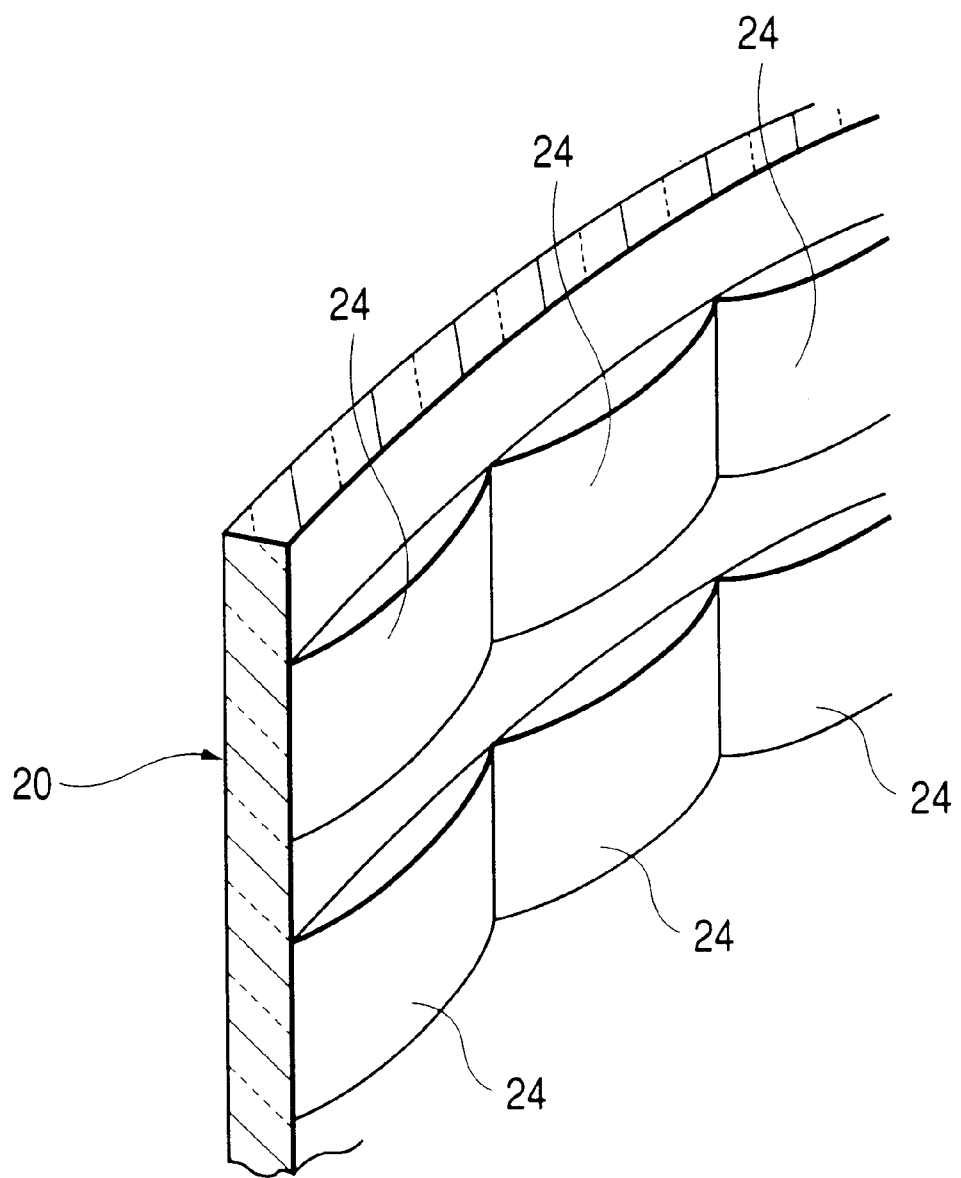
FIG. 7 is a perspective view showing diffusion steps formed on a front lens.

FIGS. 1 to 7 show an automotive rear combination lamp embodiment, wherein FIG. 1 is a horizontal cross-sectional view of the rear combination lamp in which a backup lamp, a turn signal lamp and a rear fog lamp are integrated therein. FIG. 2 is a vertical cross-sectional view of a portion of the rear combination lamp at a position where the backup lamp is disposed (a cross-sectional view taken along the line II—II shown in FIG. 1). FIG. 3 is a front view of a printed sheet disposed inwardly of a front lens, and FIG. 4 is an enlarged exploded perspective view of the same printed sheet. FIG. 5 is an enlarged vertical cross-sectional view of the printed sheet (a cross-sectional view taken along the line V—V shown in FIG. 3). FIG. 6 is an enlarged vertical cross-sectional view of the same lamp (a cross-sectional lamp taken along the line VI—VI shown in FIG. 3), and FIG. 7 is a perspective view showing diffusion steps formed on the front lens.

In these figures, reference numeral 10 denotes a lamp body of a horizontally extending receptacle-like rear combination lamp which opens from the rear to the side of a vehicle body. A backup lamp body portion 10A, a turn signal lamp body portion 10B, a rear fog lamp body portion 10C and a dummy area lamp body portion 10D are integrally formed in that order as viewed from the inside in a transverse direction of the vehicle.

A horizontally extending curved rectangular front lens 20 is integrally joined to the front opening of the lamp body 10 through thermal welding, whereby lamp chamber spaces for the respective lamps are defined within the lamp body 10 (a lamp chamber space A for a backup lamp chamber, a lamp chamber space B for the turn signal lamp, a lamp chamber space C for the rear fog lamp and a lamp chamber space D for the dummy area). Reference 12 denotes bulkheads extending from the lamp body 10 to a position close to the front lens 20 for preventing light in the respective lamp chambers from being mixed with each other.

Silver paint is provided on an internal side of the lamp body 10 so as to form parabolic reflectors 14A to 14C is on internal circumferential surfaces of the respective lamp body portions 10A to 10C. Bulb mounting holes 15A to 15C are formed at the rearmost portions of the respective lamp body portions, and incandescent bulbs 16A to 16C are securely inserted in the mounting holes.

The front lens 20 is colorless and transparent (hereinafter, referred to as clear). A flexible printed sheet 30 is disposed, as shown in FIG. 2, in a gap between a back side of the front lens 20 and a circumferential edge portion of the front opening of the lamp body in such a manner that the printed sheet is positioned without any looseness in the gap by bringing a circumferential edge portion 30a thereof into engagement with both the back side of the front lens and the circumferential edge portion of the lamp body opening.

When the lamp is not illuminated, the sheet 30 disposed inwardly of the front lens 20 becomes visible through the front lens 20, whereby an area 20D at an end of the front lens 20 matching the dummy area D is seen red, areas 20C, 20A of the front lens 20 matching the lamp chamber space C of the rear for lamp and the lamp chamber space A of the backup lamp are seen white, and an area 20B of the lens 20 matching the lamp chamber space B of the turn signal lamp is seen amber. Moreover, a bright amber horizontally striped pattern 22 is constructed so as to appear on the areas 20A to 20B matching, respectively, the lamp chamber space A of the backup lamp and the lamp chamber space B of the turn signal lamp.

Namely, as shown in FIG. 4, a first pattern P1 comprising an amber transparent layer 40 is formed on an external surface of a horizontally extending clear sheet main body 31 of polycarbonate through printing. The amber transparent layer 40 consists of a rectangular pattern 42 which is sized so as to correspond to the lamp chamber B and a horizontally striped pattern 44 in which stripes extend across the lamp chamber B horizontally.

A second pattern P2 is formed on the rectangular pattern 42 of the first pattern P1 (the amber transparent layer 40) through printing, the second pattern P2 being sized so as to correspond to the size of the lamp chamber B or the rectangular pattern 42 and consisting of a red opaque layer 50 in which red dot patterns 52 are densely collected into horizontal stripes. In addition, the density of the red dot patterns 52 is designed to increase as they approach the lamp chamber C side or to gradate in an opposite fashion.

Therefore, although the whole area on the printed sheet 30 matching the turn signal lamp (the lamp chamber B) is seen in the amber color of the amber opaque layer 50, the printed sheet 30 is affected by the color (the red of the red dot patterns 52) of the second pattern P2 as it approaches the rear fog lamp side (the lamp chamber C) and is seen as assuming red.

A third pattern P3, which is a convex three-dimensional layer 60, is formed through printing on the amber transparent layer 40 having the second pattern P2 formed partially thereon. The convex three-dimensional layer 60 consists of string-like convex three-dimensional colorless transparent portions 62 extending longitudinally over the whole area of the amber transparent layer 40 in a horizontal stripe fashion which each has a width equivalent to that of the respective stripe portions of the horizontally striped pattern 44 of the first pattern P1 (the amber transparent layer 40).

A fourth pattern P4, which is a metallic plating-like printed layer 70, is formed through printing on an internal surface of the sheet main body 31 over an area matching the amber transparent layer 40. The metallic plating-like layer 70 has a light reflecting function and consists of a horizontally striped pattern 74 having the same configuration as that of the third pattern P3 (the convex three-dimensional colorless transparent portions 62), and a vertically rectangular pattern at a proximal end portion of the layer 70 which are integrated with each other. Consequently, the horizontally striped pattern 74 of the metallic plating-like printed layer 70 and the convex three-dimensional colorless transparent portions 62 of the convex three-dimensional layer 60 are laminated at the same locations but on different sides of the sheet main body 31.

A fifth pattern P5, which is a light shielding layer 80 having the same configuration as that of the metallic plating-like printed layer 70 (the fourth pattern P4) is formed through painting on (in FIG. 4, on the bottom of) the metallic plating-like printed layer 70 which is the fourth pattern P4. This light shielding layer 80 is colored gray and is finished roughly on the surface thereof, so that light is partially shielded by absorption and partially shielded by diffusion of light led thereto from the lamp chambers. Only a limited amount of light is reflected on the light shielding layer 80, and the light so reflected is diffused, and therefore, light reflected on the light shielding layer 80 is not reflected in turn on the reflectors 14A, 14B in such a manner as to be allowed to be transmitted through the main body of the sheet 31 to result in glare.

Due to this configuration, the amber horizontally striped pattern formed over the areas on the printed sheet 30 which match, respectively, the backup lamp and the turn signal lamp, are viewed as shining and three-dimensionally. Thus, the horizontally striped pattern is viewed as a pattern over the areas 20A to 20B on the front lens 20 which match, respectively, the lamp chamber space A of the backup lamp and the lamp chamber space B of the turn signal lamp.

In addition, a rectangular pattern P6 consisting of a red transparent layer 90 is formed through printing on the internal surface of the sheet main body 31 over an area matching the dummy area D. But no such printed pattern as those formed on the other areas is formed on an area of the sheet main body 31 which matches the lamp chamber C.

As shown in FIGS. 5, 6, and 7, cylindrical steps 24 which are light diffusing steps, are formed on the back side of the front lens 20 at locations which match areas of the printed sheet 30 where the colored patterns are not formed (locations interposed between the convex three-dimensional colorless transparent portions 62). Due to this structure, when the lamps are illuminated, white light that passed through the area of the printed sheet 30 where the colored pattern is not formed from the lamp chamber A side for the backup lamp, and light that has turned amber after having passed through the printed sheet 30 (the amber transparent layer 40) from the lamp chamber B side for the turn signal lamp, are diffused transversely for distribution.

Next, how the various lamps (the backup lamp, the turn signal lamp, and the rear fog lamp) look, respectively, when they are illuminated will be described in detail.

Firstly, when no lamp (backup lamp, turn signal lamp, rear fog lamp) is illuminated, the printed sheet 30 disposed inwardly of the transparent front lens 20 is seen through the same front lens 20, and at the backup lamp area 20A, the amber horizontally striped portion matching the metallic plating-like printed layer 70 is seen three-dimensionally, as if it were raised up. At the turn signal lamp area 20B, the whole front lens 20 (20B) is seen amber, and furthermore, the amber and graded-red horizontally striped portion matching the metallic plating-like printed layer 70 is seen three-dimensionally as if it were raised up.

As shown in FIGS. 5 and 6, external light L1 which enters from the convex three-dimensional colorless transparent portions 62 via a dark-colored bumper and the ground passes through the amber transparent layer 40 and the sheet main body 31, and is then reflected by the metallic plating-like printed layer 70 and exits from the convex three-dimensional colorless transparent portions 62 via the sheet main body 31 and the amber transparent layer 40. Since the surface of the convex three-dimensional colorless transparent portion 62 has an arc-like cross section, light so exiting is then diffused, so that a reduction in the brightness of the horizontally striped portion by the dark colored bumper and the ground is minimized, to an as low as possible level.

In addition, at the rear fog lamp area 20C, the sheet main body 31 on which the colored pattern is not formed is seen through the front lens 20 as white.

At the portion on the front lens 20 which matches the dummy area D, the red pattern P6 on the sheet 30 disposed inwardly of the lens 20 is seen through the same lens as it is. This portion is seen as if the front lens 20 is a red lens, whereby the portion looks integrated into a lamp 200 (refer to FIG. 2) disposed above the dummy area D which functions as tail and stop lamps.

When the backup lamp is illuminated, light directed forward directly from the bulb 16A, and light directed forward after having been reflected on the reflector 14A, that has passed through the areas on the printed sheet 30 where no colored pattern is formed (the area where no light shielding layer 80 is formed and the area where no amber transparent layer 40 is formed) is diffused transversely by the cylindrical steps 24 on the front lens 20 for distribution (whereupon the front lens 20 is illuminated in white light).

Additionally, when the backup lamp is illuminated, light that has not passed through the area on the printed sheet 30 where no colored pattern is formed (the area where no light shielding layer is formed) is shielded by the light shielding layer 80 formed on the printed sheet 30, so that no light on the lamp chamber A side reaches the amber transparent layer 40 at all. Therefore, light does not mix with amber light exiting from the front lens 20 (the front lens 20 is not illuminated in a color assuming the amber color).

When the turn signal light is illuminated, light directed forward directly from the bulb 16B and light directed forward after having been reflected on the reflector 14B, passes through the area on the printed sheet 30 where no light shielding layer is formed and assumes the amber color when it passes through the amber transparent layer 40. This light is then diffused transversely by the cylindrical steps on the front lens 20 for distribution (whereupon the front lens 20 is illuminated in an amber color).

Additionally, when the turn signal lamp is illuminated, light that has not passed through the area on the printed sheet 30 where no colored pattern is formed (the area where no light shielding layer is formed) is shielded by the light shielding layer 80 formed on the printed sheet 30. No light from the lamp chamber B reaches the red opaque layer 50 at all, and therefore light does not mix with red light exiting from the front lens 20 (the front lens 20 is not illuminated in a red color).

Figure 8:
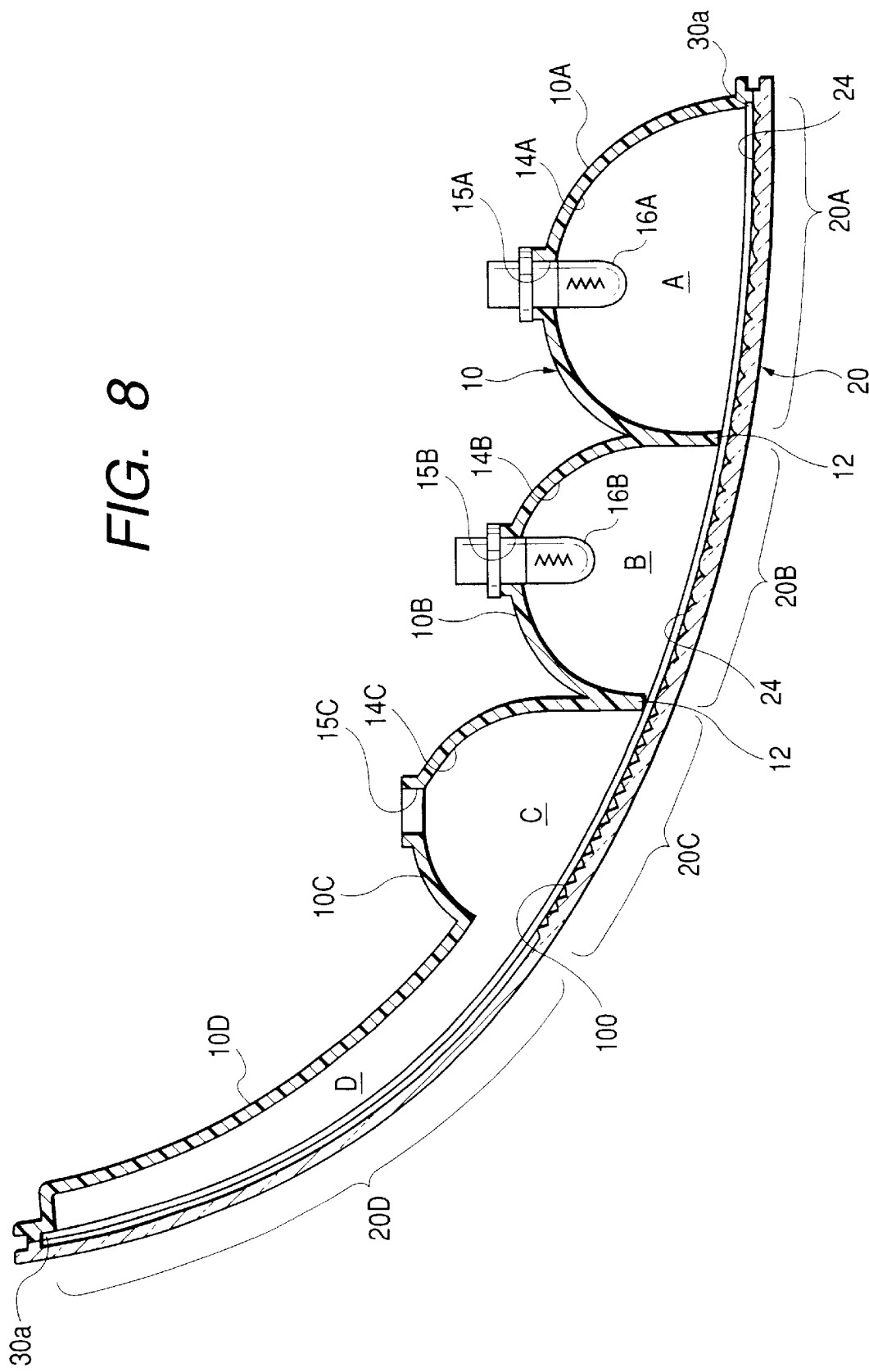
FIG. 8 is a horizontal cross-sectional view of an automotive rear combination lamp according to a second embodiment of the invention.
Figure 9:
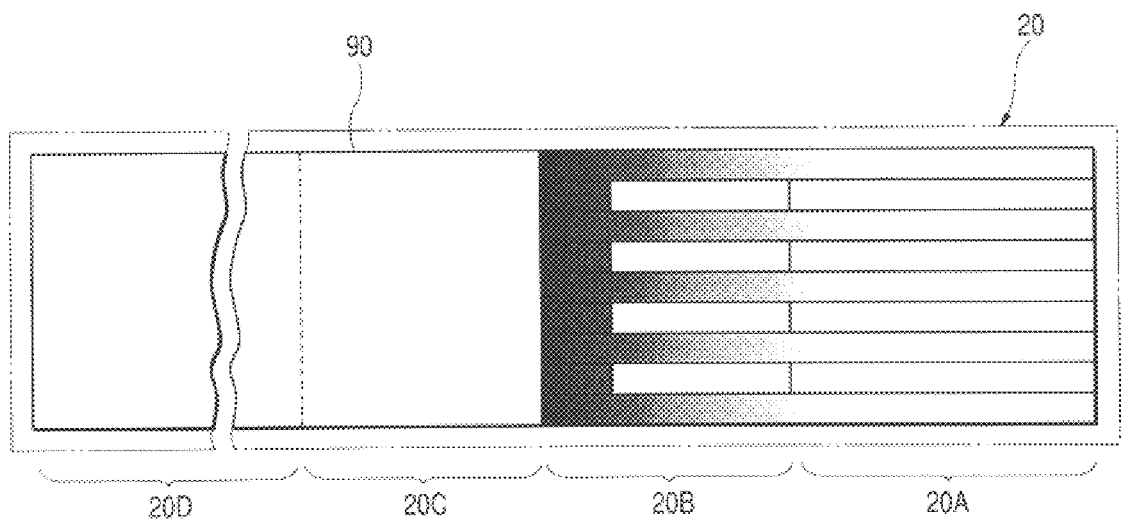
FIG. 9 is a front view of a printed sheet disposed inwardly of a front lens.

FIGS. 8 and 9 show a second embodiment. FIG. 8 is a horizontal cross-sectional view of an automotive rear combination lamp, and FIG. 9 is a front view of a printed sheet disposed inwardly of a front lens.

In the first embodiment, construction of the rear combination lamp, the backup lamp, the turn signal lamp and the rear fog lamp are integrated thereinto. But in the construction of the second embodiment, a reflex reflector 100 is provided instead of the rear fog lamp.

Namely, no bulb is inserted into a bulb insertion hole 15C in a lamp body portion 10C, and the reflex reflector (the reflex reflecting surface) 100 is formed on a back side of the front lens 20 over an area which matches the lamp body portion 10C (the lamp chamber C). External light entering the area of the front lens 20 which matches the reflex reflector 100 is reflected on the reflex reflector 100 (the reflex reflecting surface) in such a manner as to return along an incident light path.

A rectangular pattern P6 of the first embodiment (see FIG. 4) consisting of a red transparent colored layer 90, is formed on the dummy area 20D on the back side of the sheet main body 31 of the printed sheet 30, is formed for this second embodiment so as to extend as far as an area 20C which matches the lamp body portion 10C (the lamp chamber C). Due to this structure, when the lamp is not illuminated, the dummy area 20D of the front lens 20, as well as the area of the same lens where the reflex reflector 100 is formed, are seen as red, so that they look integrated into a lamp 200 provided with a red lens which is disposed above the dummy area D so as to function as both tail and stop lamps (refer to FIG. 3).

In addition, horizontally striped dot patterns appearing on the front lens on the turn signal lamp are designed such that the density of the red color increases as they approach the reflex reflector 100 side, thereby providing a feeling of integration of the lamps including the tail and stop lamp 200 which are disposed in and around the rear combination lamp.

As is clear from what has been described, when the vehicle lamp is not illuminated, the colored pattern of the printed sheet is seen shining and three-dimensionally through the front lens, and therefore a superior external appearance can be provided.

When the lamp is illuminated, the front lens can be illuminated in a predetermined functional color (for example, white) which is not affected at all by the color of the colored pattern on the printed sheet. The front lens can also be illuminated in a predetermined functional color (for example, amber) by selecting the predetermined functional color (for example, amber) as a color for the colored transparent layer. Thus, the lamp concept can be applied to lamps for various types of applications.

In addition, since the plating-like printed layer can be formed inexpensively when compared with conventional deposited layers, the production cost of a printed sheet and hence of a lamp can be reduced equally.

According to a second feature, by selecting a color that is close to the functional color of the adjacent lamp or the color of the vehicle body, for the colored opaque layer formed between the colored transparent layer and the convex three-dimensional colorless transparent layer, the color of the front lens, when the lamp is not illuminated, can blend into the color of the peripheral portion of the lamp. Consequently, a color integration can be produced on the periphery of the lamp.

According to a third aspect, by selecting as a color that is close to the functional color of the adjacent lamp or the color of the vehicle body, for the colored opaque layer formed between the colored transparent layer and the convex three-dimensional colorless transparent layer, the color of the front lens, when the lamp is not illuminated, can naturally blend into the color of the peripheral portion of the lamp. Consequently, a feeling of further integration can be produced on the periphery of the lamp.

According to a fourth aspect, the horizontal stripes are seen as shining and being highlighted on the front lens when the lamp is not illuminated. Therefore, such a lamp can be best suited to a backup lamp in which the front lens emits white light, which is a functional color thereof, in an ensured fashion when the lamp is not illuminated.

What is claimed is:

1. A vehicle lamp in which a lamp chamber is defined by a lamp body and a colorless transparent front lens mounted in a front opening of said lamp body, in which a light source is disposed in said lamp chamber, and in which a printed sheet is disposed inwardly of said front lens, said printed sheet comprising:

a sheet main body of colorless synthetic resin having a colored transparent layer printed in a predetermined pattern on a surface of said sheet main body;

a convex three-dimensional colorless transparent layer;

a plating-like printed layer; and a light shielding layer, wherein said colored transparent layer as a lower layer and said convex three-dimensional colorless transparent layer as an upper layer are formed in a laminated fashion on at least a part of an external surface of said sheet main body of said printed sheet, and wherein said plating-like printed layer as a lower layer and said light shielding layer as an upper layer are formed in a laminated fashion on an internal surface of said sheet main body at a location matching the location of said convex three-dimensional colorless transparent layer.

2. The vehicle lamp according to claim 1, wherein said convex three-dimensional colorless transparent layer is formed on a part of a surface of said colored transparent layer formed on the whole area of the external surface of said sheet main body, and wherein a colored opaque layer is formed between said colored transparent layer and said convex three-dimensional colorless transparent layer, and said colored opaque layer has a color different from that of said colored transparent layer.

3. The vehicle lamp according to claim 1, wherein a colored opaque layer is formed between said colored transparent layer and said convex three-dimensional colorless transparent layer, and wherein said colored opaque layer has a color different from that of said colored transparent layer and is provided with a gradation function in which a density of the color of said colored opaque layer change s gradually.

4. The vehicle lamp according to claim 2, wherein a colored opaque layer is formed between said colored transparent layer and said convex three-dimensional colorless transparent layer, and wherein said colored opaque layer has a color different from that of said colored transparent layer and is provided with a gradation function in which a density of the color of said colored opaque layer changes gradually.

5. The vehicle lamp according to claim 1, wherein said colored transparent layer is provided with a horizontal stripe-like patterned portion in which a plurality of horizontally extending string-like portions are arranged sequentially in a vertical direction and substantially parallel with one another, and wherein said light source is constituted by an incandescent bulb which emits white light.

6. A printed sheet disposed inwardly of a front lens of a vehicle lamp comprising:

a sheet main body having a top surface and a bottom surface;

a colored transparent layer printed in a predetermined layer and laminated into the top surface of said sheet main body;

a convex three-dimensional transparent layer laminated onto said colored transparent layer;

a plating-like printed layer laminated onto the bottom surface of said sheet main body; and a light shielding layer laminated onto said plating-like printed layer at a location that matches the location of said convex three-dimensional transparent layer.

7. The printed sheet according to claim 6, wherein said convex three dimensional transparent layer is the same length as said sheet main body.

8. The printed sheet according to claim 6, further comprising a colored opaque layer interposed between said colored transparent layer and said convex three-dimensional layer, said colored opaque layer being a color different than the color of said colored transparent layer.

9. The printed sheet according to claim 8, wherein a density of the color of said colored opaque layer changes gradually along a length of said colored opaque layer.

10. A method for forming a printed sheet for a lens of a vehicle lamp comprising:

forming a sheet main body of synthetic resin having a top surface and a bottom surface;

laminating at least one colored transparent layer onto the top surface of the sheet main body;

laminating a convex three-dimensional transparent layer onto the colored transparent layer;

laminating a plating-like printed layer onto the bottom surface of the sheet main body; and laminating a light shielding layer onto the plating-like printed layer at a location matching the location of the convex three-dimensional transparent layer.

* * * * *